United States Patent [19]

Domba

[11] 3,989,636
[45] Nov. 2, 1976

[54] POLYMERIC COMPOSITION WITH CHELATING PROPERTIES

[75] Inventor: Elmer Domba, Olympia Fields, Ill.

[73] Assignee: Nalco Chemical Company, Oak Brook, Ill.

[22] Filed: June 19, 1975

[21] Appl. No.: 588,536

[52] U.S. Cl. .............................. 252/180; 21/2.7 R; 210/52; 252/547; 252/175
[51] Int. Cl.² ........................ C02B 1/00; C02B 1/22
[58] Field of Search ................... 252/180, 547, 175; 21/2.7 R; 260/534 M, 2 BP; 210/54 R, 52

[56] References Cited
UNITED STATES PATENTS

| | | | |
|---|---|---|---|
| 2,926,154 | 2/1960 | Keim | 210/54 C |
| 3,492,502 | 2/1970 | Coscia | 260/2 BP |
| 3,519,559 | 7/1970 | Quinlan | 210/54 R |
| 3,730,888 | 5/1973 | Buckman et al. | 210/52 |

*Primary Examiner*—Mayer Weinblatt
*Assistant Examiner*—Edith R. Buffalow
*Attorney, Agent, or Firm*—John G. Premo; Robert A. Miller; Barry W. Sufrin

[57] ABSTRACT

This invention discloses novel amino acid-epihalohydrin copolymers with good chelating properties.

4 Claims, No Drawings

POLYMERIC COMPOSITION WITH CHELATING PROPERTIES

A polymeric composition with good chelating properties has been discovered. This composition is an amino acid-epihalohydrin copolymer. The composition is effective at high temperatures over extended periods and is, therefore, useful in treating boiler water. The composition prevents and removes hardness, thereby reducing boiler deposits, corrosion and scale formation.

The novel polymers of my invention may be readily synthesized. A straightforward method of synthesis, which is set forth in greater detail below, requires that an aqueous solution of an amino acid and sodium hydroxide be prepared. This aqueous solution is then treated with the epihalohydrin to produce the copolymer.

Useful amino acid constituents in the copolymer include aspartic acid, glycine and generally, all amino acids. Amino acids containing a single acidic carboxyl group and a single amino group are preferred starting materials. A preferred single carboxyl group amino acid is glycine. Useful epihalohydrins include epichlorohydrin, epibromohydrin and epiiodohydrin. The preferred epihalohydrin is epichlorohydrin.

In preparing the aqueous solution of the amino acid and sodium hydroxide, the molar ratio of amino acid to sodium hydroxide should lie in the range of 1.0 to 3.0. A preferable molar ratio of amino acid to sodium hydroxide is 2.0. The molar ratio of epihalohydrin to the amino acid should lie in the range of 0.5 to 2.0, with a ratio of 1.0 preferred.

Since the reaction between the amino acid and the epihalohydrin is exothermic, the amino acid-sodium hydroxide mixture should be placed in a vessel immersed in an ice bath prior to the addition of the epihalohydrin. The reaction temperature, upon addition of the epihalohydrin, should not be allowed to exceed 90° C.

The copolymer of the invention is a good chelating agent. It is, therefore, useful as a scale suppressant in treating high hardness boiler water. Since it is stable at high temperatures (200° to 400° C or higher) in contrast to many widely used chelating agents, this copolymer is especially suitable for treating boiler water.

When employed as a boiler scale suppressant, copolymers in a molecular weight range of 300 to 700 are most effective. The preferred molecular weight for this application is 300 to 400. Useful dosages for this application lie in the range of 5.0 to 500 ppm. Preferred dosages lie in the range of 25 to 150 ppm.

EXAMPLES 1. 75 grams of glycine were dissolved in a 100 ml. of water. 80 grams of sodium hydroxide were then added, and the vessel containing this aqueous solution was immersed in an ice bath.

The glycine-sodium hydroxide mixture was then treated with 92.5 grams of epichlorohydrin, followed by agitation for at least 5 minutes. The reaction temperature was maintained below 90° C.

It is believed that the polymer formed may be described by the formula:

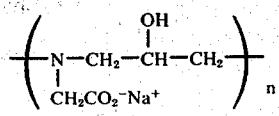

where $n = 2$ to $3$.

2. 133 grams of aspartic acid were dissolved in a 100 ml. of water. 80 grams of sodium hydroxide were then added, and the vessel containing this aqueous solution was immersed in an ice bath.

The aspartic acid-sodium hydroxide mixture was then treated with 92.5 grams of epichlorohydrin, followed by agitation for at least 5 minutes. The reaction temperature was maintained below 90° C.

It is believed that the polymer formed may be described by the formula:

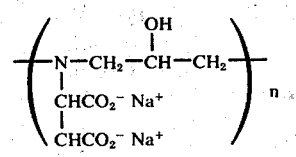

where $n = 2$ to $3$.

3. The copolymers produced in Examples 1 and 2 were evaluated for effectiveness in scale prevention as described below.

The test equipment used consisted of an inclined tube experimental boiler with natural thermal circulation. Volume at natural operating level was 0.56 gallon. The water level itself was automatically controlled by 3 insulated electrodes which made contact with the boiler water to operate relays which controlled the feedwater pump and heating element. Pressure control was by manual adjustment of a needle valve in the condensed steam line. Boiler test specimens were low carbon steel tubes, 1½ inch O.D. × 10 inches long, closed at one end and flanged at the other. The tubes were bolted in the boiler at an angle of 30° from the horizontal with the closed end down. Heat was applied to the inside and water surrounded the outside. A soft corrugated copper gasket was used to seal the tube in the boiler. The test surface itself was cleaned and polished with No. 3/0 emery paper before each test. Tests were run in absence of chemical (blank) and in a comparative manner with varying dosages of the test chemical. Percent scale prevention was then calculated by measuring deposition of scale upon the test specimen with benefit of the copolymers of Examples 1 and 2 while using the blank run as a basic comparison and a base of 0% reduction.

The feedwater contained:

Run No. 1 — Glycine-Epichlorohydrin (Example 1 Product)

2.9 ppm Ca as $CaCO_3$
3.1 ppm Mg as $CaCO_3$
16 ppm phenolphthalien alkalinity as $CaCO_3$
48 ppm total alkalinity as $CaCO_3$
10 ppm NaCl as NaCl
1.1 ppm Fe as Fe
5 ppm $SiO_2$ as $SiO_2$ (approx.)
43 ppm $SO_4$ as $Na_2SO_4$
at 600 p.s.i.g. and 252° C.

Run No. 2 — Aspartic Acid-Epichlorohydrin (Example 2 Product)

2.8 ppm Ca as $CaCO_3$
2.7 ppm Mg as $CaCO_3$
12 ppm phenolphthalien alkalinity as $CaCO_3$
44 ppm total alkalinity as $CaCO_3$
18 ppm NaCl as NaCl
1.1 ppm Fe as Fe
6.6 ppm $SiO_2$ as $SiO_2$
40 ppm $SO_4$ as $Na_2SO_4$
at 600 p.s.i.g. and 252° C.

The feedwater in Run 1 was treated with 27.9 ppm of the glycine-epichlorohydrin copolymer produced in Example 1; the feedwater in Run 2 was treated with 63 ppm of the aspartic acid-epichlorohydrin copolymer of Example 2. The experimental boiler was run for 48 hours in each case. After 48 hours, the feedwater concentrated up to 11 concentrations in Run 1 and 9 concentrations in Run 2. The test results were as follows:

Run No. 1

% Scale Prevention: 70%
Deposit Analysis: Fe > Si > Mg > Ca >> S
Appearance: Very thin, dark deposit, lumps of iron uniformly distributed.

BLOWDOWN COMPOSITE 3.4 ppm Ca as $CaCO_3$
5.5 ppm Mg as $CaCO_3$
442 ppm phenolphthalien alkalinity as $CaCO_3$
556 ppm total alkalinity as $CaCO_3$
150 ppm NaCl as NaCl
1.9 ppm Fe as Fe
35 ppm $SiO_2$ as $SiO_2$
510 ppm $SO_4$ as $Na_2SO_4$ Run No. 2

% Scale Prevention: 65%
Appearance: Very thin, dark deposit, lumps of iron oxide uniformly distributed.

BLOWDOWN COMPOSITE 2.0 ppm Ca as $CaCO_3$
No detectable Mg
384 ppm phenolphthalien alkalinity as $CaCO_3$
588 ppm total alkalinity as $CaCO_3$
250 ppm NaCl as NaCl
1.1 ppm Fe as Fe
32 ppm $SiO_2$ as $SiO_2$
510 ppm $SO_4$ as $Na_2SO_4$

I claim:

1. A composition useful in preventing and removing hardness in boiler water consisting essentially of a copolymer of an amino acid chosen from the group consisting of glycine and aspartic acid, and an epihalohydrin, said copolymer having a molecular weight in the range of 300 to 700.

2. The composition of claim 1 wherein the ratio of amino acid to epihalohydrin is in the range of 0.5 to 2.0.

3. The composition of claim 1 wherein the amino acid is glycine and the epihalohydrin is epichlorohydrin.

4. A method of treating boiler water to prevent and remove hardness which comprises treating said boiler water with from 5 to 500 ppm of the composition of claim 1.

* * * * *